US009126592B2

(12) United States Patent
Park et al.

(10) Patent No.: US 9,126,592 B2
(45) Date of Patent: Sep. 8, 2015

(54) METHOD AND APPARATUS FOR MONITORING UNINTENDED VEHICLE MOTION

(71) Applicant: GM GLOBAL TECHNOLOGY OPERATIONS LLC, Detroit, MI (US)

(72) Inventors: Jeong J. Park, Ann Arbor, MI (US); Mark A. Vernacchia, Northville, MI (US); Aubrey Walter Downs, Jr., Brighton, MI (US); Aaron C. Bowles, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 88 days.

(21) Appl. No.: 14/093,803

(22) Filed: Dec. 2, 2013

(65) Prior Publication Data

US 2015/0151739 A1 Jun. 4, 2015

(51) Int. Cl.
*B60W 10/08* (2006.01)
*B60W 20/00* (2006.01)
*B60W 10/06* (2006.01)
*F16H 59/14* (2006.01)
*F16H 61/12* (2010.01)
*F16H 59/48* (2006.01)

(52) U.S. Cl.
CPC .............. *B60W 20/40* (2013.01); *B60W 10/06* (2013.01); *B60W 10/08* (2013.01); *F16H 59/14* (2013.01); *F16H 59/48* (2013.01); *F16H 61/12* (2013.01); *F16H 2059/147* (2013.01); *F16H 2059/148* (2013.01); *Y10T 477/20* (2015.01); *Y10T 477/23* (2015.01)

(58) Field of Classification Search
CPC ... Y10T 477/20; Y10T 477/23; B60W 10/06; B60W 10/08; F16H 61/12; F16H 59/14; F16H 2059/147; F16H 2059/148; F16H 59/48
USPC .......... 701/54, 62, 22; 477/2, 3, 904, 906, 110
See application file for complete search history.

(56) References Cited

U.S. PATENT DOCUMENTS

| | | | | |
|---|---|---|---|---|
| 3,911,343 | A * | 10/1975 | Oster | 388/847 |
| 5,725,214 | A * | 3/1998 | Adams | 273/158 |
| 2009/0043466 | A1* | 2/2009 | Nakai et al. | 701/55 |
| 2009/0063000 | A1* | 3/2009 | Kodama et al. | 701/75 |
| 2012/0059539 | A1* | 3/2012 | Arnett et al. | 701/22 |
| 2012/0290187 | A1* | 11/2012 | Oesterreicher et al. | 701/99 |
| 2013/0151074 | A1* | 6/2013 | Takeuchi et al. | 701/37 |
| 2013/0297111 | A1* | 11/2013 | Yamazaki et al. | 701/22 |
| 2014/0244084 | A1* | 8/2014 | Raftry | 701/22 |

* cited by examiner

*Primary Examiner* — Roger Pang (57) ABSTRACT

A powertrain system is configured to transfer propulsion torque to a driveline of a vehicle. A method for controlling the powertrain system includes determining a magnitude of unintended vehicle motion based upon a difference between a change in actual vehicle acceleration and a change in an operator-intended vehicle acceleration. Propulsion torque to the driveline is limited when a fault associated with unintended vehicle motion is detected and the magnitude of unintended vehicle motion is less than a predetermined first threshold.

19 Claims, 3 Drawing Sheets

METHOD AND APPARATUS FOR MONITORING UNINTENDED VEHICLE MOTION

TECHNICAL FIELD

This disclosure is related to controls for vehicle powertrain systems.

BACKGROUND

The statements in this section merely provide background information related to the present disclosure. Accordingly, such statements are not intended to constitute an admission of prior art.

A potential torque security fault can cause a motion hazard wherein unintended vehicle motion deviates from an expected level by a magnitude that is greater than a threshold level of vehicle acceleration. Known vehicle control systems employ protections for fault detection and remediation to prevent occurrences of unintended vehicle motion, including removing propulsion from vehicle drive axle(s). A false positive torque security fault detection can cause an unnecessary vehicle disablement.

SUMMARY

A powertrain system is configured to transfer propulsion torque to a driveline of a vehicle. A method for controlling the powertrain system includes determining a magnitude of unintended vehicle motion based upon a difference between a change in actual vehicle acceleration and a change in an operator-intended vehicle acceleration. Propulsion torque to the driveline is limited when a fault associated with unintended vehicle motion is detected and the magnitude of unintended vehicle motion is less than a predetermined first threshold.

BRIEF DESCRIPTION OF THE DRAWINGS

One or more embodiments will now be described, by way of example, with reference to the accompanying drawings, in which.

DETAILED DESCRIPTION

Figure 1:
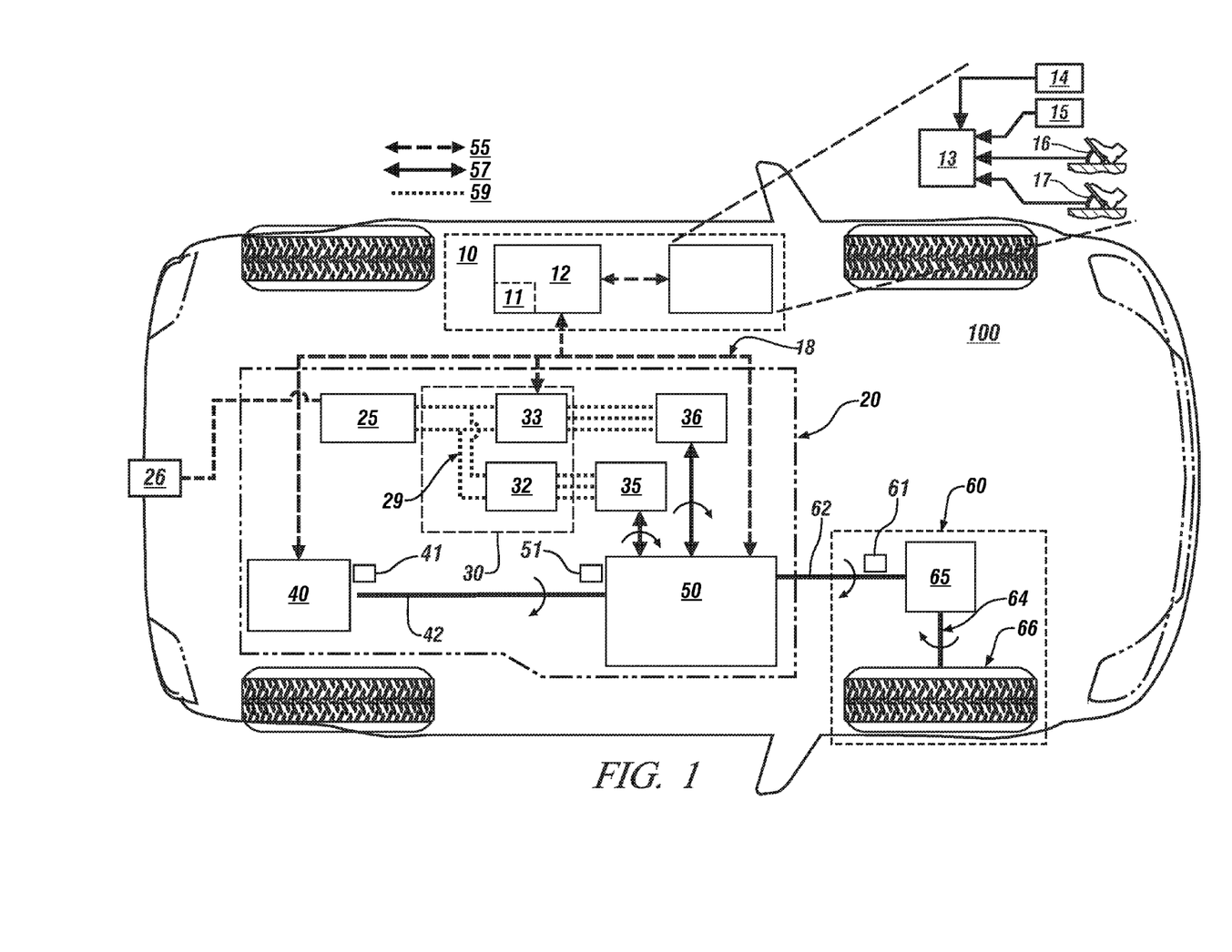
FIG. 1 illustrates a vehicle including a multi-mode powertrain system coupled to a driveline and controlled by a control system, in accordance with the disclosure.

Referring now to the drawings, wherein the showings are for the purpose of illustrating certain exemplary embodiments only and not for the purpose of limiting the same, FIG. 1 illustrates a vehicle 100 including a powertrain system 20 coupled to a driveline 60 and controlled by a control system 10. The powertrain system 20 employs multiple torque-generative devices, including an internal combustion engine (engine) 40 and first and second electrically-powered torque machines 35 and 36, respectively, that are configured to transfer propulsion torque to a driveline 60 via a transmission 50 that operates in one of a plurality of selectable fixed gear and electrically-variable modes. The concepts described herein can be applied to other powertrain configurations, including powertrain systems employing a single torque-generative device and powertrain systems employing multiple torque-generative devices, including a powertrain configuration that includes a single electrically-powered torque machine arranged in series with the engine and transmission. Like numerals refer to like elements throughout the description.

The powertrain system 20 employs communications paths 55, mechanical power paths 57, and high-voltage electric power paths 59. The mechanical power paths 57 mechanically couple elements that generate, use, and/or transfer torque, including the engine 40, the first and second torque machines 35, 36, transmission 50 and driveline 60. The high-voltage electric power paths 59 electrically connect elements that generate, use, and/or transfer high-voltage electric power, including the energy storage system 25, an inverter module 30, and the first and second torque machines 35, 36. The high-voltage electric power paths 59 include a high-voltage electrical power bus 29. The communications path 55 includes high-speed data transfer lines to effect communications between various elements of the vehicle, and may include one or more of a direct connection, a local area network bus, a serial peripheral interface bus, and a high-speed communications bus 18.

The engine 40 is preferably a multi-cylinder direct fuel injection internal combustion engine that converts fuel to mechanical power through a combustion process. The engine 40 is equipped with a plurality of sensing devices and actuators configured to monitor operation and deliver fuel to form a combustion charge to generate torque. Engine sensing devices preferably include a crank position sensor 41 for monitoring rotational position and speed.

The transmission 50 preferably includes one or more differential gear sets and controllable clutch components to effect torque transfer over a range of speeds between the engine 40, the first and second torque machines 35, 36, and an output member 62 that couples to the driveline 60. In one embodiment the transmission 50 is a two-mode transmission device configurable to transfer torque in one of an input-split mode and a compound-split mode. Mechanical power originating in the engine 40 may be transferred via an input member 42 to the first torque machine 35 and to the output member 62 via the transmission 50. Mechanical power originating in the first torque machine 35 may be transferred to the engine 40 via the transmission 50 and the input member 42, and may be transferred to the output member 62 via the transmission 50. Mechanical power originating in the second torque machine 36 may be transferred via the transmission 50 to the output member 62. Mechanical power may be transferred between the transmission 50 and the driveline 60 via the output member 62. Operating parameters associated with mechanical power transfer include power between the engine 40 via the transmission 50 indicated by input torque and input speed, and power between the transmission 50 and the driveline 60 indicated by output torque and output speed. The driveline 60 may include a differential gear device 65 that mechanically couples to an axle 64 or half-shaft that mechanically couples to a ground-engaging drive wheel 66 in one embodiment. The differential gear device 65 is coupled to the output member 62 of the powertrain system 20. The driveline 60 transfers propulsion power between the transmission 50 and a road surface. An input speed sensor 51 monitors rotation of the input member 42 and a vehicle speed sensor 61 is configured to monitor rotation of the output member 62 to provide data including rotational position, speed, and direction of rotation to the control system 10. The data from the vehicle speed sensor 61 is employed to determine a magnitude and direction of vehicle speed and vehicle acceleration in one embodiment.

The first and second torque machines 35, 36 preferably include multi-phase electric motor/generators electrically connected to the inverter module 30 that is configured to convert stored electric energy to mechanical power and convert mechanical power to electric energy that may be stored in the energy storage system 25. The first and second torque machines 35, 36 have limitations in power outputs in the form of minimum and maximum torques and rotational speeds.

The inverter module 30 includes first and second inverters 32 and 33 that electrically connect to the first and second torque machines 35, 36, respectively. The first and second torque machines 35, 36 interact with the respective first and second inverters 32 and 33 to convert stored electric energy to mechanical power and convert mechanical power to electric energy that may be stored in the energy storage system 25. The energy storage system 25 may be any suitable energy storage system, for example a plurality of electrical cells, ultracapacitors, and other suitable devices configured to store electric energy on-vehicle. One exemplary energy storage system 25 is a high-voltage battery fabricated from a plurality of lithium-ion cells. Further references to energy storage system 25 will be as battery 25. In one embodiment, an external connector 26 electrically connects to the battery 25 and is connectable to an external AC power source to provide electric power for charging the battery 25 during vehicle static periods.

The control system 10 includes a control module 12 that signally connects to an operator interface 13 and includes a plurality of control routines for controlling operation of the powertrain system 20, including a torque monitoring control routine 11. The operator interface 13 includes a plurality of human/machine interface devices through which the vehicle operator commands and controls operation of the vehicle, including an operator acceleration request via an accelerator pedal 17, an operator braking request via a brake pedal 16, a transmission range, preferably selected via a PRNDL lever 15 or another suitable device, a vehicle speed request, e.g., through a cruise control system 14, and vehicle operation control via an ignition key. Although the control module 12 and operator interface 13 are shown as individual discrete elements, such illustration is for ease of description. The functions described as being performed by the control module 12 may be combined into one or more devices, e.g., implemented in software, hardware, and/or application-specific integrated circuitry (ASIC) and ancillary circuits that are separate and distinct from the control module 12. Information transfer to and from the control module 12 may be accomplished using the communications paths 55, including, e.g., communications bus 18. The control module 12 preferably signally and operatively connects to individual elements of the powertrain system 20 via the communications bus 18. The control module 12 signally and/or operatively connects to the sensing devices of each of the battery 25, the inverter module 30, the first and second torque machines 35, 36, the engine 40, and the transmission 50 to monitor and control operation and determine parameters thereof.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, example each 100 microseconds, 3.125, 6.25, 12.5, 25 and 100 milliseconds during ongoing engine and vehicle operation. Alternatively, routines may be executed in response to occurrence of an event.

Figure 2:
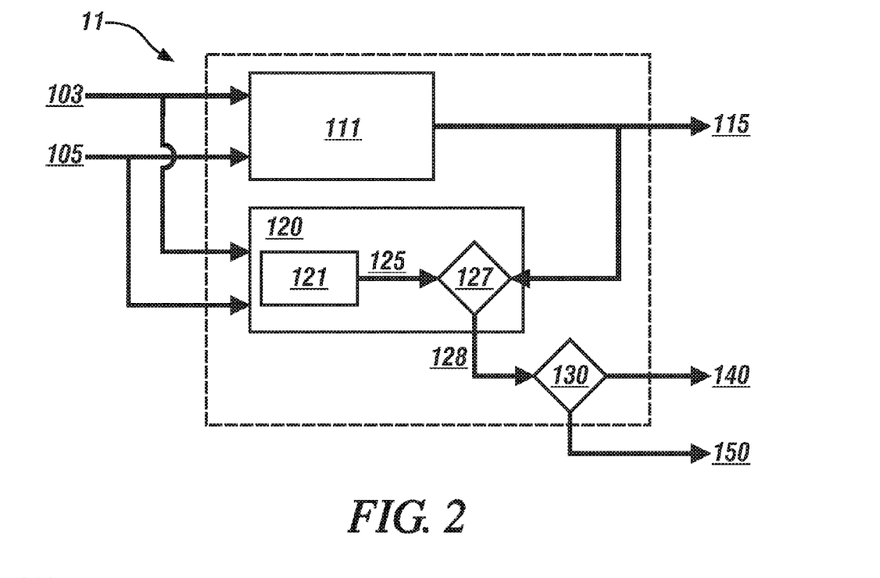
FIG. 2 illustrates a torque monitoring control routine for controlling and monitoring operation of an embodiment of the multi-mode powertrain system, in accordance with the disclosure.

FIG. 2 schematically an exemplary torque monitoring control routine 11 for controlling and monitoring operation of the multi-mode powertrain system 20 of FIG. 1. The torque monitoring control routine 11 includes a torque control scheme 111 that executes in parallel with a torque monitoring scheme 120. The torque control scheme 111 generates a plurality of torque commands 115 for controlling operation of the torque machines 35 and 36 and the engine 40 in response to a plurality of monitored control and operating parameters 103 and reference parameters 105. The torque monitoring scheme 120 executes in parallel with the torque control scheme 111 to verify that the plurality of torque commands 115 generated by the torque control scheme 111 are responsive to the monitored control and operating parameters 103 and reference parameters 105, or alternatively, that there is a fault in the torque monitoring control routine 11 that may cause a deviation in the plurality of torque commands 115 generated by the torque control scheme 111 that may lead to unintended vehicle motion. A fault in the torque monitoring control routine 11 can be related to a fault in the torque control scheme 111 and/or a fault in the torque monitoring scheme 120.

Inputs to the torque monitoring control routine 11 include monitored control and operating parameters 103 associated with operation of the powertrain system 20 and reference parameters 105. The control and operating parameters 103 preferably include vehicle operator commands for torque and speed, operating states of the powertrain system including electric motor and engine speeds and torques, and others. The reference parameters 105 include battery power limitations and others.

The torque control scheme 111 generates the torque commands 115 in response to the monitored control and operating parameters 103 and reference parameters 105 employing known routines that balance engine and torque machine factors that are related to torque capabilities, power consumptions, efficiencies, response times and other considerations. The torque monitoring scheme 120 includes control routines 121 that are analogous to the control routines of the torque control scheme 111 to determine a plurality of verification torque commands 125. The control routines 121 may be located and executed in another controller, or are otherwise physically and electronically separated from the control routines of the torque control scheme 111.

A comparator routine 127 compares the torque commands 115 and the verification torque commands 125 to evaluate or otherwise assess conformance therebetween. The comparator routine 127 determines that there is conformance between the torque commands 115 and the verification torque commands 125 when a difference between the torque commands 115 and the verification torque commands 125 is less than a predetermined threshold difference. When there is conformance, the torque commands 115 are implemented with no further action.

When there is no conformance, the comparator routine 127 generates a torque command variance 128. The torque command variance 128 indicates that there is a possibility of unintended vehicle motion that results in an unexpected vehicle acceleration that is greater than a threshold acceleration, e.g., an acceleration greater than 0.2 g. The torque command variance 128 can be attributed to a fault associated with the torque control scheme 111 requiring system remediation that includes a system shutdown 140 removing propulsion torque from the driveline. Alternatively, the torque command variance 128 can be attributed to a fault associated with the torque monitoring scheme 120 requiring system remediation that includes powertrain operation to reduce the propulsion torque to the driveline 150. An unintended motion detection control routine (UMD control routine) 130 can be employed to evaluate the torque command variance 128. The UMD control routine 130 decides whether the torque command variance 128 can be attributed to a fault associated with the torque control scheme 111 requiring system remediation that includes a system shutdown 140 to remove propulsion torque from the driveline, or alternatively, a determination that the torque command variance 128 can be attributed to a fault associated with the torque monitoring scheme 120 requiring system remediation that includes powertrain operation to reduce the propulsion torque to the driveline 150.

Figure 3:
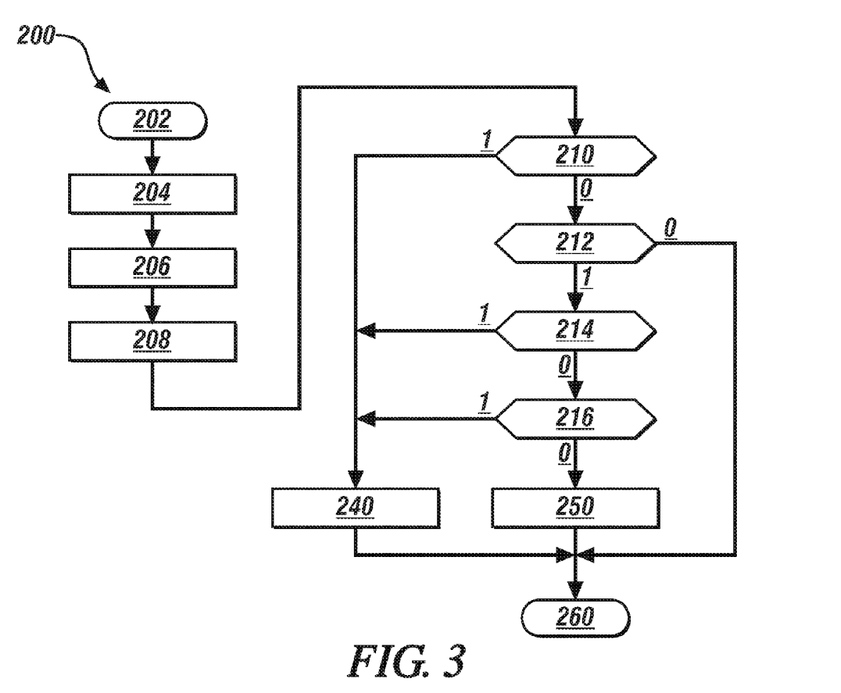
FIG. 3 illustrates a control scheme employing motion detection logic for detecting unintended vehicle motion, in accordance with the disclosure.

FIG. 3 schematically shows an exemplary unintended motion detection control routine (UMD control routine) 200 that employs motion detection logic to detect unintended vehicle motion, including safety-critical unintended vehicle motion. The detection of unintended vehicle motion can be employed to determine whether a torque command variance requires system remediation including a powertrain system shutdown removing propulsion torque from the driveline or a system remediation including powertrain system operation in a reduced performance mode to reduce the propulsion torque to the driveline. The motion detection logic for detecting unintended vehicle motion accounts for disturbances coming from vehicle operation conditions that affect vehicle motion. Vehicle acceleration can be derived from a vehicle dynamics equation as follows:

$$F = m \cdot \frac{dv}{dt} + \frac{\rho}{2} \cdot C_D \cdot A_f \cdot v^2 + \mu \cdot m \cdot g \cdot \cos\theta + m \cdot g \cdot \sin\theta \quad [1]$$

wherein $m \cdot \frac{dv}{dt}$ is vehicle acceleration, $\frac{\rho}{2} \cdot C_D \cdot A_f \cdot v^2$ is aerodynamic drag,
$\mu \cdot m \cdot g \cdot \cos\theta$ is rolling resistance,
$m \cdot g \cdot \sin\theta$ is gravity resistance,
m is vehicle mass,
v is vehicle velocity,
$\rho$ is air density,
$C_D$ is drag coefficient,
$A_f$ is vehicle frontal area,
$\mu$ is rolling friction coefficient,
g is the acceleration constant, and
$\theta$ is road slope.

The vehicle acceleration is determined in accordance with the following relationship which is a rearrangement of EQ. [1].

$$a \equiv \frac{dv}{dt} = \frac{F}{m} - \frac{1}{m}\left(\frac{\rho}{2} \cdot C_D \cdot A_f \cdot v^2 + \mu \cdot m \cdot g \cdot \cos\theta + m \cdot g \cdot \sin\theta\right) \quad [2]$$

When axle torque $T_{axle}=F*r_{tire}$, wherein $r_{tire}$ is a dynamic tire radius, EQ. 2 can be rewritten as follows.

$$a \equiv \frac{dv}{dt} = \frac{T_{axle}}{m \cdot r_{tire}} - \left(\frac{\rho}{2m} \cdot C_D \cdot A_f \cdot v^2 + \mu \cdot g \cdot \cos\theta + g \cdot \sin\theta\right) \quad [3]$$

The actual acceleration $a_{actual}$ and the intended acceleration $a_{intended}$ can be expressed as follows utilizing using EQ. 3.

$$a_{actual} = \frac{T_{axle\_act}}{m \cdot r_{tire}} - \left(\frac{\rho}{2m} \cdot C_D \cdot A_f \cdot v^2 + \mu \cdot g \cdot \cos\theta + g \cdot \sin\theta\right) \quad [4]$$

$$a_{intended} = \frac{T_{axle\_int}}{m \cdot r_{tire}} - \left(\frac{\rho}{2m} \cdot C_D \cdot A_f \cdot v^2 + \mu \cdot g \cdot \cos\theta + g \cdot \sin\theta\right) \quad [5]$$

wherein $T_{axle\_act}$ is an actual axle torque, which can be either directly measured or otherwise determined, and
$T_{axle\_int}$ is an intended axle torque, which is directly related to the operator torque request.

Thus, an unintended acceleration can be expressed as a difference between the actual acceleration $a_{actual}$ (EQ. [4]) and the intended acceleration $a_{intended}$ (EQ. [5]), when the actual acceleration $a_{actual}$ and the intended acceleration $a_{intended}$ are reliably estimated as follows.

$$a_{unintended} = \quad [6]$$
$$a_{actual} - \left[\frac{T_{axle\_int}}{m \cdot r_{tire}} - \left(\frac{\rho}{2m} \cdot C_D \cdot A_f \cdot v^2 + \mu \cdot g \cdot \cos\theta + g \cdot \sin\theta\right)\right]$$

Vehicle acceleration can be estimated from the vehicle dynamics only when the operating conditions shown in EQS. [4], [5] and [6] are accurately monitored. However, estimating operating conditions of vehicle mass and velocity, road slope and surface type, and weather conditions requires algorithm development and use of on-vehicle measurement devices that are impractical.

Instead, a change in the unintended acceleration $\delta a_{unintended}$ within a short time period can be determined and used to detect unintended motion when the change in the unintended acceleration $\delta a_{unintended}$ exceeds a predetermined threshold, in accordance with the following relationship.

$$\delta a_{unintended} = \delta a_{actual} - \delta a_{intended} \quad [7]$$

where $\delta a = a(t_2) - a(t_1)$, $\delta t = t_2 - t_1 \ll 1$ second

Thus, when the actual acceleration $a_{actual}$ is reliably estimated or otherwise determined and the intended axle torque(s) is known, the change in unintended acceleration within the short time period can be found in accordance with the following relationship.

$$\hat{a}_{actual} = a_{actual} + w \quad [8]$$

wherein $\hat{a}_{actual}$ is estimated actual acceleration and
w is an estimation or measurement error.

Thus, the following can be calculated during ongoing vehicle operation.

$$\delta a_{actual} = \hat{a}_{actual}(t_2) - \hat{a}_{actual}(t_1) \quad [9]$$

$$\delta a_{intended} = a_{intended}(t_2) - a_{intended}(t_1)$$

$$a_{intended}(t_1) = \frac{T_{axle\_int}(t_1)}{m(t_1) \cdot r_{tire}} -$$
$$\left(\frac{\rho(t_1)}{2m(t_1)} \cdot C_D \cdot A_f \cdot v(t_1)^2 + \mu(t_1) \cdot g \cdot \cos\theta(t_1) + g \cdot \sin\theta(t_1)\right)$$

$$a_{intended}(t_2) = \frac{T_{axle\_int}(t_2)}{m(t_2) \cdot r_{tire}} -$$
$$\left(\frac{\rho(t_2)}{2m(t_2)} \cdot C_D \cdot A_f \cdot v(t_2)^2 + \mu(t_2) \cdot g \cdot \cos\theta(t_2) + g \cdot \sin\theta(t_2)\right)$$

The operating conditions are substantially unchanged over the short time period in which each determination of the change in the unintended acceleration $\delta a_{unintended}$ is calculated ($\delta t = t_2 - t_1 \ll 1.0$ sec). The operating conditions are considered substantially unchanged in that the magnitude of change occurring in the vehicle operating conditions during the short time period have a de minimis effect upon the calculations of the intended accelerations $a_{intended}(t_1)$ and $a_{intended}(t_2)$, and thus the operating conditions have a de minimis effect upon the calculation of the change in the intended acceleration $\delta a_{intended}$. This permits cancellation of the terms that are associated with the operating conditions in EQ. 9, allowing EQ. 9 to be rewritten as follows in EQ. 10 to permit determining a change in the intended acceleration $\delta a_{intended}$ based upon the a change in the intended axle torque $T_{axle\_int}$, which is directly related to the operator torque request.

$$\delta a_{intended} = a_{intended}(t_2) - a_{intended}(t_1) = \quad [10]$$
$$\frac{T_{axle\_int}(t_2)}{m(t_2) \cdot r_{tire}} - \frac{T_{axle\_int}(t_1)}{m(t_1) \cdot r_{tire}} = \frac{T_{axle\_int}(t_2) - T_{axle\_int}(t_1)}{m(t) \cdot r_{tire}}$$

Thus the change in unintended acceleration over a short time period can be determined in accordance with the following relationships.

$$\delta a_{unintended} = \delta a_{actual} - \delta a_{intended} \quad [11]$$

$$\delta a_{actual} - \delta a_{intended} =$$
$$[\hat{a}_{actual}(t_2) - \hat{a}_{actual}(t_1)] - \frac{1}{m \cdot r_{tire}}[T_{axle\_int}(t_2) - T_{axle\_int}(t_1)]$$

The intended axle torques and the estimated actual accelerations are parameters that are available in the controller.

EQ. 11 indicates the magnitude of the change in unintended acceleration within a short time window, e.g., less than 200 ms. In one embodiment, the change in unintended acceleration is calculated during each 6.25 ms time loop. The change in unintended acceleration can be employed to discriminate between a remediation action requiring a system shutdown to remove propulsion torque from the driveline and a remediation action requiring reduced performance to reduce propulsion torque to the driveline. Such discriminating action reduces the likelihood a system shutdown and a walk-home event in response to a detection of a fault that does not affect vehicle motion.

The UMD control routine 200 is executed to monitor operation of a multi-mode powertrain system employed on a vehicle, including, e.g., the powertrain system 100 described with reference to FIG. 1. The UMD control routine 200 periodically executes during ongoing vehicle operation as part of torque monitoring. Table 1 is provided as a key to FIG. 3 wherein the numerically labeled blocks and the corresponding functions are set forth as follows.

TABLE 1

| BLOCK | BLOCK CONTENTS |
|---|---|
| 202 | Start |
| 204 | Estimate intended acceleration |
| 206 | Motion detection logic—determine change in the unintended acceleration $\delta a_{unintended}$ |
| 208 | Filter |
| 210 | Is change in the unintended acceleration $\delta a_{unintended}$ > critical threshold? |
| 212 | Is a torque security fault detected? |
| 214 | Is torque security fault from torque control scheme? |
| 216 | Is change in the unintended acceleration $\delta a_{unintended}$ significant? |
| 240 | Execute system shutdown |
| 250 | Operate powertrain in reduced performance mode |
| 260 | End |

Vehicle acceleration is proportional to system torque, which can be controlled to achieve an operator torque request. Hence, intended acceleration is proportional to the operator torque request. Unintended motion is defined as vehicle acceleration that significantly deviates from intended acceleration. There are several valid, non-fault-related, non-safety critical reasons why actual acceleration may not correlate to acceleration associated with the operator torque request, including, e.g., actuator lags, engine intake manifold fill times, motor torque capability, battery power limitations, derated motor operation, and other similar operating considerations. However, unintended motion that is less than the intended vehicle acceleration is not critical in the context of this disclosure.

During each iteration of the UMD control routine 200 (202), the intended acceleration is estimated (204). The operator torque request is determined in another control routine based upon inputs from the human/machine interface devices through which the vehicle operator commands and controls operation of the vehicle. Vehicle acceleration can be estimated using known control routines based upon monitored inputs, including, e.g., the rotational speed of the vehicle speed sensor. In order to simplify the correlation, the signals of the operator torque request and the estimated acceleration can be converted into the acceleration domain. The estimated vehicle acceleration $a_{estimated}$ can be in proportion to the vehicle acceleration as indicated by the monitored output of the transmission, and determined in accordance with the following equation.

$$a_{estimated}(g) = \frac{2\pi \cdot r(m)}{9.81 \cdot 60 \cdot FDR} \cdot TOS(\text{rpm/s}) \quad [12]$$

wherein
FDR is the final drive ratio of the vehicle,
r is tire radius,
m is vehicle mass, and
TOS is the estimated output acceleration, e.g., as measured at the axle.

The intended acceleration $a_{intended}$ can be determined in relation to the operator torque request $To_{request}$, using EQ. 5, shown again in part as follows.

$$a_{intended}(g) = \frac{To_{request} \cdot FDR}{9.81 \cdot m(kg) \cdot r(m)} \quad [13]$$

wherein
FDR is the final drive ratio of the vehicle,
r is tire radius,
m is vehicle mass, and
9.81 is the acceleration constant g.

The change in unintended acceleration $\delta a_{unintended}$ is determined using a control subroutine that implements motion detection logic employing the relationships described with reference to EQs. 1 through 11 including the estimated vehicle acceleration $a_{estimated}$ and the intended acceleration $a_{intended}$ determined as described with reference to EQs. 12 and 13 (206).

The change in unintended acceleration $\delta a_{unintended}$ is subjected to filtering, including, e.g., generating a figure of merit (208), after which the change in unintended acceleration $\delta a_{unintended}$ is compared to a critical acceleration threshold, which is a magnitude of unintended acceleration that is immediately discernible by the vehicle operator, e.g., greater than 0.5 g of acceleration (210). When the magnitude of the change in unintended acceleration $\delta a_{unintended}$ is greater than the critical acceleration threshold (210)(1), propulsion torque being generated by the powertrain system is immediately removed from the vehicle drive axles and/or drive wheels of the driveline (240). Removing propulsion torque can include commanding and executing a system shutdown to deactivate the torque-generative devices including, e.g., opening a high-voltage switch on the high-voltage electrical power bus and opening clutches in the transmission. When the magnitude of the change in unintended acceleration $\delta a_{unintended}$ is less than the critical acceleration threshold (210)(0), it is determined whether a security fault has been detected (212). Detecting a security fault includes detecting a fault in hardware devices and/or embedded software that can be caused, by way of example, by a fault in an ALU (arithmetic logic unit), RAM/ROM corruption, software faults such as an index overflow, or another fault. When no security fault has been detected (212)(0), this iteration of the UMD control routine 200 ends (260) with no further action.

When a security fault has been detected (212)(1), it is determined whether the security fault originates from the torque control scheme or the torque monitoring scheme (214). When the security fault originates from the torque control scheme (214)(1), the system shutdown is immediately commanded to remove propulsion torque from the driveline (240). The torque control scheme includes elements of hardware, control routines, calibrations and the like that are employed in commanding and controlling torque in the powertrain system. The torque monitoring scheme includes elements of hardware, control routines, calibrations and the like that are employed in monitoring torque output in the powertrain system.

When the security fault does not originate from the torque control scheme (214)(0), it is determined whether the change in unintended acceleration $\delta a_{unintended}$ is greater than a significant threshold, e.g., 0.2 g of acceleration (216), and if so (216)(1), the system shutdown is immediately commanded to remove propulsion torque from the driveline (240). When the change in unintended acceleration $\delta a_{unintended}$ is less than the significant threshold (216)(0), the powertrain is operated in a reduced performance mode to limit the propulsion torque to the driveline (250) and this iteration of the UMD control routine 200 ends (260). Operating the powertrain system in the reduced performance mode to limit the propulsion torque to the driveline (250) includes control routines and calibrations that can be employed to derate torque outputs from the torque machines and the engine to limit powertrain system torque.

Figure 4:
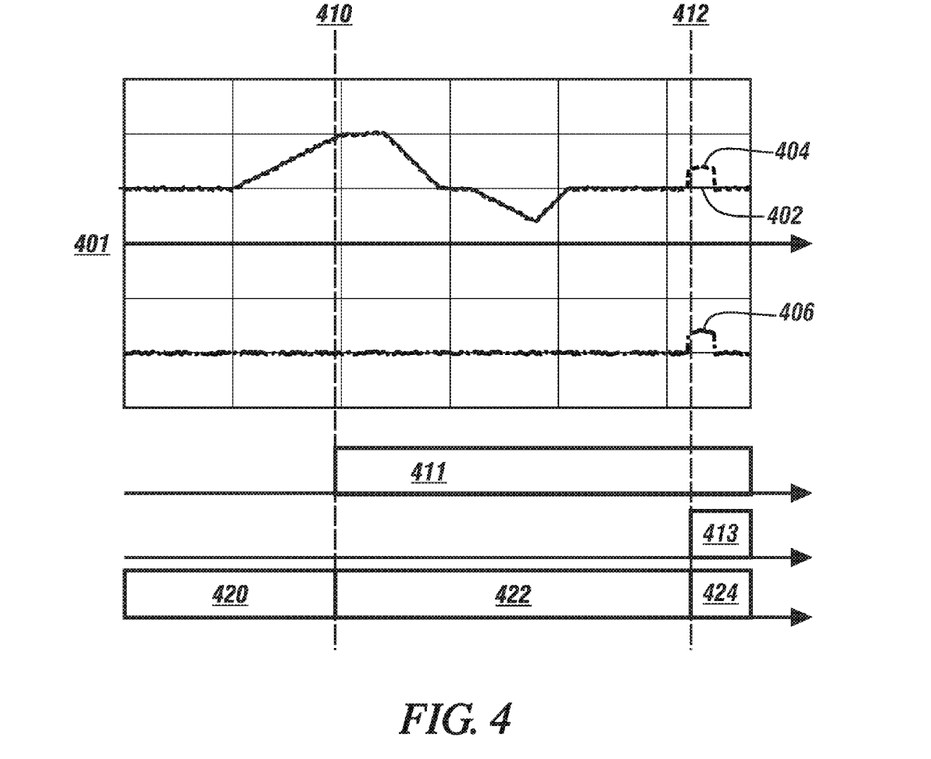
FIG. 4 illustrates operation of a vehicle employing an embodiment of a control scheme to detect unintended vehicle motion, in accordance with the disclosure.

FIG. 4 graphically shows operation of a vehicle employing a control scheme to detect unintended vehicle motion. Monitored parameters include an intended acceleration 402, an actual measured acceleration 404, and an unintended acceleration 406, plotted in relation to time, which is shown on the horizontal axis. Fault detection 411 and unintended motion detection 413 are also shown.

Prior to time 410, no fault is detected, and normal vehicle operation 420 is commanded. At time 410, a system fault is detected as indicated by fault detection 411, but no unintended vehicle motion is detected. Thus vehicle operation includes operating in the reduced performance mode 422. Vehicle operation is unaffected, but a malfunction indicator lamp on the vehicle instrument panel may be illuminated. At time 412, the actual acceleration 404 deviates from the intended acceleration 402 by an amount greater than the threshold, resulting in detection of unintended vehicle motion 413 leading to command to shutdown system operation 424 to remove propulsion torque from the driveline.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a powertrain system configured to transfer propulsion torque to a driveline of a vehicle, comprising:
    determining a magnitude of unintended vehicle motion based upon a difference between a change in actual vehicle acceleration and a change in operator-intended vehicle acceleration; and
    limiting propulsion torque to the driveline when a fault associated with unintended vehicle motion is detected and the magnitude of unintended vehicle motion is less than a predetermined first threshold.

2. The method of claim 1, wherein the change in the actual vehicle acceleration is determined in relation to monitored vehicle motion.

3. The method of claim 1, wherein the change in the operator-intended vehicle acceleration is determined based upon an operator torque request.

4. The method of claim 1, wherein determining the magnitude of unintended vehicle motion comprises determining the magnitude of unintended vehicle motion in accordance with the following relationship:

$$\delta a_{actual} - \delta a_{intended} =$$
$$[\hat{a}_{actual}(t_2) - \hat{a}_{actual}(t_1)] - \frac{1}{m \cdot r_{tire}} [T_{axle\_int}(t_2) - T_{axle\_int}(t_1)]$$

wherein $\delta a_{actual}$ is the change in the actual vehicle acceleration, $\delta a_{intended}$ is the change in the intended vehicle acceleration, $\hat{a}_{actual}(t_1)$ is an estimated actual acceleration at time $t_1$, $\hat{a}_{actual}(t_2)$ is estimated actual acceleration at time $t_2$, $T_{axle\_int}(t_1)$ is an operator-intended vehicle acceleration at time $t_1$, $T_{axle\_int}(t_2)$ is an operator-intended vehicle acceleration at time $t_1$, m is vehicle mass, $r_{tire}$ is a dynamic tire radius, $t_1$ is a time at the beginning of a time period, and $t_2$ is a time at the end of the time period.

5. The method of claim 4, wherein the time period comprises a period of time wherein magnitudes of changes in vehicle operating conditions have a de minimis effect upon the change in the intended acceleration $\delta a_{intended}$.

6. The method of claim 1, further comprising removing propulsion torque from the driveline when the magnitude of unintended vehicle motion is greater than a predetermined second threshold that is greater than the predetermined first threshold.

7. The method of claim 1, further comprising removing propulsion torque from the driveline when the fault associated with unintended vehicle motion comprises a fault originating from a torque control scheme.

8. The method of claim 1, further comprising removing propulsion torque from the driveline when the fault associated with unintended vehicle motion comprises a fault originating from a torque monitoring scheme and the magnitude of unintended vehicle motion is greater than the predetermined first threshold.

9. A method for controlling a powertrain system configured to transfer propulsion torque to a driveline of a vehicle, comprising:

determining a magnitude of unintended vehicle motion for a time period based upon a difference between a change in actual vehicle acceleration and a change in operator-intended vehicle acceleration; and operating the powertrain system to limit propulsion torque to the driveline when a fault associated with unintended vehicle motion is detected and the magnitude of unintended vehicle motion for the time period is less than a predetermined first threshold.

10. The method of claim 9, wherein the change in the actual vehicle acceleration is determined based upon monitored vehicle motion for the time period.

11. The method of claim 9, wherein the change in the operator-intended vehicle acceleration is determined based upon an operator torque request for the time period.

12. The method of claim 9, wherein determining the magnitude of unintended vehicle motion comprises determining the magnitude of unintended vehicle motion in accordance with the following relationship:

$$\delta a_{actual} - \delta a_{intended} =$$
$$[\hat{a}_{actual}(t_2) - \hat{a}_{actual}(t_1)] - \frac{1}{m \cdot r_{tire}} [T_{axle\_int}(t_2) - T_{axle\_int}(t_1)]$$

wherein $\delta a_{actual}$ is the change in the actual vehicle acceleration, $\delta a_{intended}$ is the change in the intended vehicle acceleration, $\hat{a}_{actual}(t_1)$ is an estimated actual acceleration at time $t_1$, $\hat{a}_{actual}(t_2)$ is estimated actual acceleration at time $t_2$, $T_{axle\_int}(t_1)$ is an operator-intended vehicle acceleration at time $t_1$, $T_{axle\_int}(t_2)$ is an operator-intended vehicle acceleration at time $t_1$, m is vehicle mass, $r_{tire}$ is a dynamic tire radius, $t_1$ is a time at the beginning of the time period, and $t_2$ is a time at the end of the time period.

13. The method of claim 12, wherein the time period is less than 200 milliseconds.

14. The method of claim 9, further comprising removing propulsion torque from the driveline when the magnitude of unintended vehicle motion is greater than a predetermined second threshold that is greater than the predetermined first threshold.

15. The method of claim 14, further comprising removing propulsion torque from the driveline when the fault associated with unintended vehicle motion comprises a fault originating from a torque control scheme.

16. The method of claim 15, further comprising removing propulsion torque from the driveline when the fault associated with unintended vehicle motion comprises a fault originating from a torque monitoring scheme and the magnitude of unintended vehicle motion is greater than the predetermined first threshold.

17. A method for controlling a powertrain system employing a plurality of torque-generative devices to transfer propulsion torque to a driveline of a vehicle, comprising:

determining a magnitude of unintended vehicle motion for a time period based upon a difference between a change in actual vehicle acceleration and a change in operator-intended vehicle acceleration; and operating the powertrain system to limit transfer of propulsion torque to the driveline when a fault associated with unintended vehicle motion is detected and the magnitude of unintended vehicle motion for the time period is less than a predetermined first threshold.

18. The method of claim 17, wherein determining the magnitude of unintended vehicle motion comprises determining the magnitude of unintended vehicle motion in accordance with the following relationship:

$$\delta a_{actual} - \delta a_{intended} =$$
$$[\hat{a}_{actual}(t_2) - \hat{a}_{actual}(t_1)] - \frac{1}{m \cdot r_{tire}} [T_{axle\_int}(t_2) - T_{axle\_int}(t_1)]$$

wherein $\delta a_{actual}$ is the change in the actual vehicle acceleration, $\delta a_{intended}$ is the change in the intended vehicle acceleration, $\hat{a}_{actual}(t_1)$ is an estimated actual acceleration at time $t_1$, $\hat{a}_{actual}(t_2)$ is estimated actual acceleration at time $t_2$, $T_{axle\_int}(t_1)$ is an operator-intended vehicle acceleration at time $t_1$,
$T_{axle\_int}(t_2)$ is an operator-intended vehicle acceleration at time $t_1$,
m is vehicle mass,
$r_{tire}$ is a dynamic tire radius,
$t_1$ is a time at the beginning of the time period, and
$t_2$ is a time at the end of the time period.

19. The method of claim 17, wherein operating the powertrain system to limit transfer of propulsion torque to the driveline comprises derating torque outputs of the torque-generative devices.

\* \* \* \* \*